June 21, 1966  H. G. ANDRÉ  3,257,238
HERMETICALLY SEALED CELL
Filed Nov. 13, 1961  2 Sheets-Sheet 1
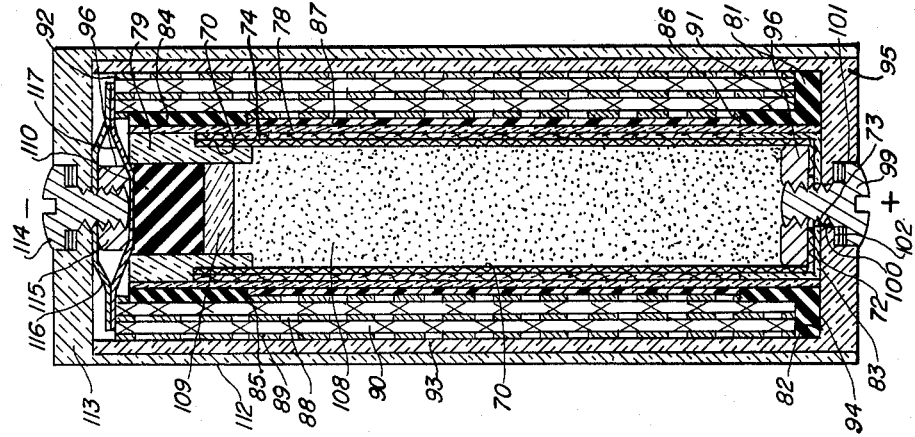
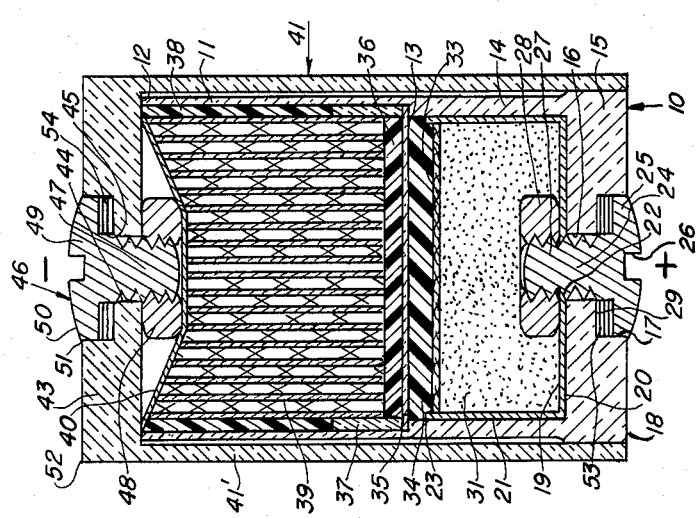
INVENTOR.
HENRI GEORGES ANDRÉ
BY *Irving Holtzman*
ATTORNEY

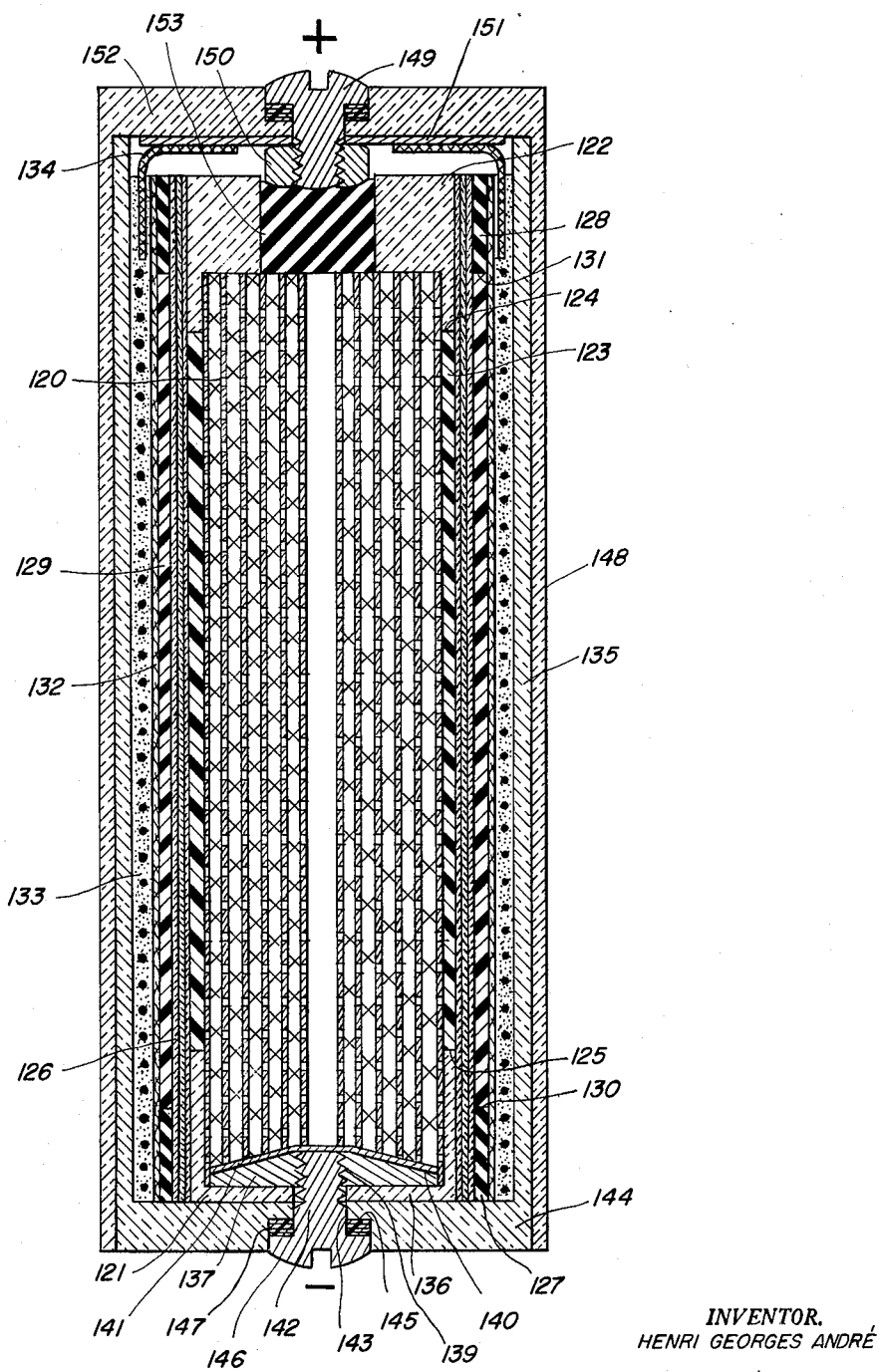

United States Patent Office 3,257,238
Patented June 21, 1966

3,257,238
HERMETICALLY SEALED CELL
Henri Georges André, Montmorency, France, assignor to Yardney International Corp., New York, N.Y., a corporation of New York
Filed Nov. 13, 1961, Ser. No. 151,664
Claims priority, application France, Nov. 23, 1960, 844,758
1 Claim. (Cl. 136—14)

This invention relates to electrochemical generators of hermetically sealed type. More particularly it relates to hermetically sealed electrochemical generators using silver oxide and zinc as active materials.

In many applications there is a need for an electrochemical generator contained within a hermetically sealed enclosure that would isolate it completely from the medium by which it is surrounded.

While electrochemical generators enclosed in this manner are already known, they have up to now been confined to the so-called primary cells which upon discharge cannot be recharged under normal conditions of use. Such generators are usually of the so-called mercury type in which the galvanic couple is composed of a positive electrode of mercuric oxide and a negative zinc electrode.

The reason for the unavailability of completely sealed rechargeable generators despite the existing need for such devices are the difficulties that arise in connection with their design and construction. In this type of generator, conditions must be met to achieve a satisfactory recharge which need not be considered in a primary cell.

It is accordingly an object of this invention to provide a rechargeable electrochemical generator that may be hermetically sealed and yet will be completely free from internal gas generation, thereby providing reversible performance, complete safety and freedom from explosion hazard.

It is a further object of the invention to provide a hermetically sealed, rechargeable, electrochemical generator possessing the favorable electrochemical properties of a silver-oxide zinc couple, a system known to present numerous advantages and merits. Thus, it is an object of the invention to provide a hermetically sealed secondary battery or accumulator which has a large storage capacity and whose operating voltage equals that normally obtained from a silver-zinc system, namely 1.56 volts.

It is still another object of the invention to provide an accumulator designed and constructed in such a manner that it will function as a primary battery on the first discharge and as a storage battery in subsequent use. Thus, it is an object of the invention to provide an electrochemical generator whose performance on the first discharge is comparable to that of a good-quality primary silver-zinc cell and which could subsequently be reused as an accumulator with performance characteristics comparable to those of a good-quality secondary silver-zinc cell.

Finally, it is an object of this invention to provide an accumulator that is light in weight even when contained in an enclosure having ample mechanical strength to withstand internal pressures to which it may be subjected as a result of various operating and temperature conditions.

All of these objects have been achieved by the combination of constructional principles and methods described below and illustrated in the accompanying drawings wherein:

FIG. 1 is an axial longitudinal cross-sectional view of a generator embodying the present invention;

FIG. 2 is an axial longitudinal cross-sectional view of another embodiment of this invention;

FIG. 3 is a longitudinal cross-sectional view of still another embodiment of this invention.

Reference will now be made to FIG. 1 pertaining to a first embodiment.

According to the invention, the casing containing the active materials is preferably made of acrylic resin, known commercially as Plexiglas. The casing consists of two parts respectively designated 10 and 41. The part 10 forms an inner housing compartment, two tubular portions 11 and 14, of unequal wall thickness, and a base 15. A circular shoulder 13 is provided at the junction of tubular portions 11 and 14. The tubular portion 11 terminates in an opening 12. The thickness of base 15 is greater than the wall thickness of tubular portion 14 which, in turn, is thicker than tubular portion 11. The base 15 is provided with a circular hole 16 which widens into a counterbore 17 located on the outer surface 18 of base 15. Resting upon the inner surface 19 of base 15 is a metal cup 21 which is preferably made of silver. The base 20 of cup 21 is provided with a hole 22 facing the opening 16. The height of cup 21 is such that its upper edge is slightly below the shoulder 13. The cup is rigidly secured to base 15 by means of a screw 24 of brass or nickel-plated steel which acts as a terminal. The screw 24 has a slightly convex head 25 which is provided with a slot 26. Its threaded portion 27 fits tightly into the hole 16. To insure a tight seal, a Plexiglas-dissolving substance, such as glycol chlorohydrin, is applied to all Plexiglas surfaces subjected to leakage pressure before the screw is mounted in position.

The sealing effect starts a few seconds after the chlorohydrin is applied, by the formation of a paste-like viscous mass which should be allowed to flow to the outside if a satisfactory seal is to be obtained. Experience has shown that the dissolving action of chlorohydrin on Plexiglas is of short duration so that no undue mechanical weakening of parts subjacent or close to the Plexiglas should be feared later as a result of chlorohydrin application.

In the embodiment being described, the threads 27 of screw 24 engage a plain or nickel-plated steel or copper nut 28. A tight seal is insured by pressure exerted between screw head 25 and counterbore surface 29. By applying a drop of glycol chlorohydrin to the surface of screw head 25, a viscous substance is introduced into the space between the sides of screw head 25 and the wall of counterbore 17 to produce a rapidly hardening film which represents a durable and perfect seal in itself. Upon tightening, the screw is brought flush with surface 18 except for the protruding convex portion of head 25.

Cup 21 is filled with the positive active material, namely silver-oxide powder 31. The powder, beside being in contact with the cup, is also in contact with nut 28 as well as with the tip of screw 24.

In order to form a more coherent mass of positive active material the powder may be subjected to prior sintering which converts it into a solid pellet. A suitable cavity must then be provided in the sintered pellet to allow space for the nut 28. The pellet preferably is inserted into the cup with a slight friction fit.

The cup filled with powder or containing the pellet is covered with a woven nylon disk 33. The latter in turn is covered with a disk 34, made of Fiberglas material, which is flush with recess 13. The assembly thus formed is impregnated with electrolyte, which is a concentrated aqueous solution of KOH containing potassium zincate. The electrolyte is introduced dropwise by allowing electrolyte drops to fall onto disk 34 until saturation is obtained. The preferred concentration of aqueous KOH ranges from 49 to 52° Baumé, i.e. a density of 1.51 to 1.56. Upon impregnation the assembly is allowed to stand for a period of 24 to 48 hours to degas the positive active material. During this stand, the oxygen adsorbed on the silver-oxide surface is liberated, which is indicated by the lowering of the initial cell voltage from 1.9 to 1.6 volts and rapid decrease in cell impedance when current is drawn from the cell.

Upon completion of the degassing phase, a round piece of regenerated cellulose or cellophane 35 is placed on top of Fiberglas disk 34 so as to bear on shoulder 13. The cellophane which acts as a separator is covered with a layer of Fiberglas or other porous material 36 having a slightly smaller diameter to allow room for a polystyrene ring 37.

The negative electrode 39 consists of a composite bimetal strip in the form of a tightly coiled spiral held in polystyrene ring 37 and wrapped in a layer of Fiberglas 38.

The bimetal spiral is made of a thin strip of zinc sheet coiled together with a thin strip of amalgamated copper. So-called "expanded" copper sheet may be used for this purpose.

The purpose of Fiberglas layer 38 is to retain the electrolyte and compensate for any nonuniformity in the spiral.

The negative-electrode assembly thus prepared is placed on top of Fiberglas layer 36.

Prior to being coiled into a spiral, the bi-metal strip is cut in such a manner that the height of the coiled spiral will be constant in its central region and will gradually increase toward its periphery. Upon insertion in the cell, the spiral is covered with a disk-shaped connecting member 40 of amalgamated copper. The circular edge of member 40 rests on the upper edge 12 of casing tube 11.

Following the closing of the assembled negative electrode with the disk-shaped member 40, more electrolyte is added dropwise to the cell and the assembly is then allowed to stand for 24 hours. Following the stand period, the assembly is placed upside down to remove any excess electrolyte. Gas measurements have shown that not only no gas is generated by the cell immediately following the addition of electrolyte, but a vacuum sets in instead, this vacuum being probably due to a reducing action by hydrogen which seems to be promoted catalytically by amalgamated copper.

Upon mounting the negative electrode, once the positive electrode is degassed, one may add electrolyte and close the assembly. A vacuum will then develop within the cell.

The second part of the casing, designated 41, forms an outer housing and is likewise of molded Plexiglas. It consists of a tubular portion 41' and a top 43. The thickness of top 43 is greater than the wall thickness of the tubular portion 41' and is equal to that of base 15. The cylindrical walls of inner housing 10 and outer housing 41, nested one in the other, aid to increase the mechanical strength. The wall 43 is provided with a countersunk bore 45 to accommodate a screw 46. Its head 49 of screw 46 has a convex surface 50 protruding beyond the surface 52 of casing top 43. Screw 46 and nut 48 are mounted similarly to the previously mentioned screw 24 and nut 28. Screw 46 is made of nickel-plated brass except for its end from which nickel plating is removed by grinding. The nut is of plain brass.

Before mounting the housing 41 on tube 11, previously assembled as described, its walls are carefully cleaned in order to remove any alkaline electrolyte adhering to it. A thin coat of glycol chlorohydrin is then applied to the lower part of tube 11 and the whole assembly is inserted into the outer housing 41 with screw 46 and nut 48 already mounted on the latter. The seal between the two parts of the casing is achieved along the portion of tube 11 which is coated with the solvent. When the tube 11 is completely inserted into the outer housing 41, the screw 46 exerts a slight pressure upon negative electrode 39 through amalgamated copper disk 40. As a result of contact with the amalgamated disk 40, both the nut 48 and the ground end of screw 46 become amalgamated, thereby eliminating any further secondary reaction.

In the embodiment under discussion, polyethylene spacers 53 and 54 are placed between the screw heads and the counterbore in the respective Plexiglas housing. If desired, these spacers may be omitted without affecting the tightness of the seal.

Batteries have been constructed in accordance with the above description, having an outer diameter of 16 mm. and a length of 25 mm. Cup 21, with a wall thickness of 0.1 mm., was filled with 2.5 grams of silver-oxide powder, carefully settled by vibration. In the case where sintered pellets were used instead of loose silver powder, the sintered pellets were oxidized electrolytically before assembly. These batteries had a capacity of 1 ampere-hour on their first discharge, working as primary cells, and a capacity of 0.5 ampere-hour on subsequent discharges, working as secondary cells. No loss of tightness could be measured after months of use. The cells performed satisfactorily during all charges and discharges, including overcharges, without showing any ill effects. It is believed that protection against overcharge may be achieved automatically by zinc forming an internal bridge in shunt across the electrodes. This effect is believed to take place concurrently with a recombination of gases generated at the end of charge, such recombination yielding water and releasing heat at a slow rate.

Reference now is made to FIG. 2, showing an embodiment in which the active materials are grouped not one above the other, as formerly described, but one around the other. Such a concentric arrangement is advantageous for a generator of greater length because of the lower internal resistance to which it leads.

A cylinder 70 of perforated or expanded metal, e.g. silver, iron or nickel, has its lower end inserted into a cup 71, whose bottom 72 has a center hole 73. Cylinder 70 is wrapped in a fabric 74, made of woven nylon or similar material, which rests on the upper rim of cup 71. A plastic insert 79, e.g. of Plexiglas, with a stepped outer surface, is introduced into the top opening of cylinder 70 and is brought in contact with the upper border of cylinder 70 and fabric 74. A sheet of cellophane 78 is wrapped in several layers around fabric 74, the cup 71 and the upper part of insert 79. This roll of cellophane is held in position by a sleeve 80 and a rubber ring 84. The sleeve 80, which could be made of mloded latex, terminates in a base 81. Around the cellophane roll 78, between the lower edge 85 of ring 84 and the upper border 86 of sleeve 80, there is a sheet of Fiberglas 87. It is to be noted that a smilar sheet could have been placed between fabric 74 and the cellophane roll. The negative active material 88 is placed around the Fiberglas sheet 87. It consists of a sheet of zinc 89 rolled together with a sheet of perforated or expanded amalgamated copper 90 for better utilization in depth. This composite sheet rests on the upper face 91 of base 81. Its height is such as to allow its upper edge 92 to extend above the sleeve 79. The composite negative electrode forms a multi-layer spiral around the positive electrode prepared as described above.

The coaxial assembly is inserted into a cylindrical inner housing 93 so that its lower surfaces 82 and 83 rest on the upper face 94 of base 95 of the sleeve. In the central cavity formed by cylinder 71, a plain steel nut 96 threadedly engages the shank of a screw 99 which is inserted through hole 73 and through an opening 100 in the base 95 of housing 93, this opening being enlarged at 101.

The housing 93 is preferably of Plexiglas. Before tightening the screw 99, a drop of glycol chlorohydrin is applied to surface 102 of opening 101 facing the head of screw 99. The outer rim of the convex side of the screw is flush with the lower face of base 95. Then the central cavity is filled with silver-oxide powder 108 up to the lower edge of plastic insert 79. The powder, settled by repeated shocks, is topped by a disk 109 of Fiberglas and over it by a rubber plug 110 flush with the upper edge of insert 79. Again, the silver oxide may also be introduced in a sintered state.

The assembly so obtained is slipped into an outer housing 112 having a cylindrical wall in contact, over its whole length or a considerable part thereof, with the cylindrical part of the inner sleeve 93. Housing 112 has a closed top 113 of the same thickness as the base 95 of the housing 93. Mounted on the top 113, in the same way as explained for base 95, is a terminal consisting of a nickel-plated screw 114 and a nut 115 of plain brass. The nut also presses on a thin ring 116 of amalgamated copper. When the inner housing 93 is completely inserted into the outer housing 111, the ring 116 presses by its peripheral portion against an amalgamated copper disk 117 which is in contact with the upper edge 92 of the negative roll, while the nut 115 presses the central part of said disk against a rubber plug 110.

The filling with electrolyte can be done in one single operation, before sealing the assembly with disk 117 and rubber plug 110. Degassing for at least 24 hours must be allowed.

Such a unit, with 14 grams silver and 8 grams zinc, has a capacity of 6 ampere-hours on the first discharge as a primary cell and 3 ampere-hours in subsequent operations as a secondary cell. Its total length is 70 mm. and its outer diameter is 24 mm. It provides 15 w.h./kg. and approximately 300 w.h./dm.$^3$.

Reference now is made to FIG. 3. In this representation, the negative active material is located in the center, and the positive active material on the periphery, the opposing electrode surfaces now being larger than in the preceding embodiment, thus reducing current density and at the same time facilitating the electrolyte penetration and diffusion to provide a particularly powerful current source.

Strips of zinc and amalgamated expanded copper are rolled together to form a negative electrode 120. The roll thus obtained has its lower end inserted in a Plexiglas cup 121. In the top the roll is held in place by a Plexiglas insert 122. The negative active material is wrapped in a Fiberglass sheet 123 which fits between rims 124 and 125 of cup 121 and of an insert 122, respectively, the assembly thus forming a cylinder. Around this cylinder, one wraps several layers (3 to 5) of a cellophane sheet 126. The cellophane wrap is held in place by latex rings 127 and 128. A second sheet of Fiberglas 129 is rolled around the cellophane wraps. The width of the Fiberglas sheet is equal to the distance between the sides 130 and 131 of the latex rings, again constituting a cylindrical assembly. This assembly is wrapped in a layer of woven nylon 132.

A tubular positive electrode is prepared separately by sintering silver powder previously pressed onto a silver mesh (expanded or woven metal), the mesh being then rolled. A silver wire is placed in the silver powder prior to sintering to serve as an electric lead in the oxidation process by means of which the silver powder is converted to silver oxide. In case the silver oxide adheres well to its carrier (as will be true with electrolytically deposited silver), the structure may be easily rolled directly around the negative electrode. If not, the negative assembly is slipped into the tubular silver oxide electrode with silver mesh or conductors protruding at the upper end. FIG. 3 shows the positive tubular electrode 133 with its emerging silver conductors 134, which are either part of the inner electrode mesh, or else silver wires incorporated into the electrode. The couple assembled in this manner is inserted into an inner Plexiglas housing 135, with addition, if necessary, of Fiberglas or woven nylon. Before the negative electrode is introduced into the cup 121, a plain brass washer 137 provided with an internal thread 139 and presenting an upper conical surface 140 is placed in the bottom 136 of the cup. This washer is covered by an amalgamated copper ring 141. When the electrode assembly is pushed downward, the washer 137 engages a nickel-plated brass screw 142, previously introduced through a hole 143 into the base 144 of housing 135, and, by screw action, the assembly is pressed against the base. A tight seal is obtained, as in the preceding embodiment, by application of a drop of glycol chlorohydrin to the counterbore 145 containing the screw head 146. A polyethylene washer 147 can be inserted between the screw head and the counterbore bottom. Electrolyte filling may be accomplished as in the aforedescribed case. An outer housing 148, fitted with a nickel-plated brass screw 149 as a positive terminal, is placed over the assembly to insure its tightness, again as in the preceding example. A plain steel nut 150 maintains a silver disk 151 against the top 152 of housing 148, this disk compressing the ends of conductor 134, bent previously towards the center. Nut 150 and screw 149 apply pressure to a rubber plug 152, inserted in the outer bore of sleeve 122.

In one model built, the primary-secondary cell had a length of 70 mm. and a diameter of 24 mm. The outputs achieved with 14 grams of silver and 8 grams of zinc were 6 ampere-hours as a primary cell and 3 ampere-hours as a secondary cell. The internal resistance was reduced to a half of that of the embodiment represented by FIG. 2 and the electrochemical impedance of the couple, by virtue of the thinness of its positive electrode, was reduced so much that the cell could deliver currents from 5 to 10 times higher with the same voltage drop at the terminals.

Whereas the invention has been described with reference to specific forms thereof, it will be understood that many changes and modifications may be made without departing from the spirit of this invention.

What is claimed is:

A hermetically sealed rechargeable electrochemical generator comprising a cylindrical casing consisting of two hollow tubes closed at one end, the open end of one tube being telescopically inserted and sealed in the open end of the other tube to form said casing; a silver-containing positive electrode, a negative electrode consisting of a rolled composite strip of zinc and amalgamated copper sheets, a semi-permeable separator and an aqueous alkaline electrolyte of potassium zincate all contained in said casing; a pair of terminals consisting of screws traversing the opposite closed ends of said casing; tension means positioned between said negative electrode and the negative screw terminal, said tension means consisting of an amalgamated copper disk holding said negative electrode under pressure upon tightening of said screw terminal.

References Cited by the Examiner

UNITED STATES PATENTS

| | | |
|---|---|---|
| 600,693 | 3/1898 | Julien. |
| 734,646 | 7/1903 | Winters _____ 136—135 |
| 1,402,956 | 1/1922 | Politowski _____ 136—14 X |
| 2,040,255 | 5/1936 | Gordon _____ 136—20.1 |
| 2,487,831 | 11/1949 | Rupp _____ 136—14 |
| 2,654,794 | 10/1953 | Zaugg _____ 136—10 X |
| 2,705,249 | 3/1955 | Ellis. |
| 2,881,238 | 4/1959 | Duddy _____ 136—20 |
| 2,920,127 | 1/1960 | Vogt _____ 136—170 X |
| 2,968,686 | 1/1961 | Duddy _____ 136—30 |
| 2,976,341 | 3/1961 | Daley _____ 136—6 X |
| 3,075,032 | 1/1963 | Andre _____ 136—6 |
| 3,104,990 | 9/1963 | Solomon et al. _____ 136—20 |
| 3,108,908 | 10/1963 | Krebs _____ 136—6 |

WINSTON A. DOUGLAS, *Primary Examiner.*

JOHN H. MACK, *Examiner.*

J. BARNEY, B. J. OHLENDORF, *Assistant Examiners.*